(12) United States Patent
Mänz

(10) Patent No.: US 8,104,709 B2
(45) Date of Patent: Jan. 31, 2012

(54) LATERAL FORCE JOINT

(75) Inventor: Christian Mänz, Hamburg (DE)

(73) Assignee: Airbus Deutschland GmbH (DE)

( * ) Notice: Subject to any disclaimer, the term of this patent is extended or adjusted under 35 U.S.C. 154(b) by 604 days.

(21) Appl. No.: 11/989,350

(22) PCT Filed: May 11, 2006

(86) PCT No.: PCT/EP2006/004441
§ 371 (c)(1),
(2), (4) Date: Apr. 6, 2009

(87) PCT Pub. No.: WO2007/012357
PCT Pub. Date: Feb. 1, 2007

(65) Prior Publication Data
US 2009/0200424 A1    Aug. 13, 2009

Related U.S. Application Data

(60) Provisional application No. 60/702,448, filed on Jul. 26, 2005.

(30) Foreign Application Priority Data

Jul. 26, 2005    (DE) .......................... 10 2005 034 891

(51) Int. Cl.
*B64C 9/00* (2006.01)
*B64C 9/02* (2006.01)
*B64C 3/00* (2006.01)
*B64C 1/06* (2006.01)

(52) U.S. Cl. .................. 244/87; 244/123.1; 244/123.8; 244/131

(58) Field of Classification Search .................... 244/87, 244/88, 91, 119, 120, 123.1, 123.7, 123.8, 244/123.9, 131
See application file for complete search history.

(56) References Cited

U.S. PATENT DOCUMENTS

| | | | |
|---|---|---|---|
| 2,383,623 A * | 8/1945 | Spicer | ........................ 244/131 X |
| 3,006,443 A | 10/1961 | Siler | |
| 4,721,406 A | 1/1988 | Davis et al. | |
| 5,842,546 A | 12/1998 | Biswas | |
| 7,562,845 B2 * | 7/2009 | Schoene | ........................ 244/119 |
| 2005/0151018 A1 | 7/2005 | Schoene | |
| 2010/0032524 A1 * | 2/2010 | Brown et al. | ............... 244/123.8 |

FOREIGN PATENT DOCUMENTS

| | | |
|---|---|---|
| CN | 1280255 | 1/2001 |
| DE | 673258 | 3/1939 |
| DE | 2601388 | 6/1977 |
| DE | 19719915 | 12/1998 |
| EP | 1066896 | 1/2001 |

(Continued)

*Primary Examiner* — Rodney B White
(74) *Attorney, Agent, or Firm* — Lerner, David, Littenberg, Krumholz & Mentlik, LLP

(57) ABSTRACT

A lateral force joint, with which a plate-like spar can be fastened to a fuselage strap mounted on an airplane fuselage. The plate-like spar has a through bore, into which a fastening cylinder mounted on the flange can be inserted for connecting both components. In order to allow for the location of the spar to be adjusted with respect to the fuselage strap, a bearing bush of the spar is eccentrically fitted into the through bore. Correspondingly, the fastening cylinder of the fuselage strap is mounted eccentrically on a bearing bush so that a rotation of the bearing bushes allows the lateral force joint to be adjusted.

12 Claims, 4 Drawing Sheets

FOREIGN PATENT DOCUMENTS

| | | |
|---|---|---|
| EP | 1550606 | 7/2005 |
| GB | 1478174 | 6/1977 |
| RU | 1559598 C | 1/1995 |
| RU | 1683269 A1 | 2/1995 |
| RU | 428656 A1 | 5/2005 |

* cited by examiner

LATERAL FORCE JOINT

REFERENCE TO RELATED APPLICATIONS

This application claims the benefit of the filing date of German Patent Application No. 10 2005 034 891.2 filed Jul. 26, 2005 and of U.S. Provisional Patent Application No. 60/702,448 filed Jul. 26, 2005, the disclosure of which applications is hereby incorporated herein by reference.

FIELD OF THE INVENTION

This invention relates in general to the technical field of joining elements. In particular, the invention relates to a lateral force joint, enabling for instance a spar of a rudder unit to be fastened to an airplane fuselage in a weight saving way. Furthermore, the invention relates to a correspondingly configured spar for a rudder unit so that the spar can be mounted on an airplane fuselage so as to save weight.

TECHNOLOGICAL BACKGROUND

During flight, the rudder unit of an airplane is often subjected to considerable air loads affecting the outer skin of the rudder unit. Such wind loads are removed as a lateral force via the spars of the rudder unit (see FIGS. 1 and 2) into the airplane fuselage. The connection of the spars of the rudder unit is then usually performed with a double shear splice joint. This splice joint is frequently composed of a bracket clip, which is riveted to the airplane fuselage and provided with two bores, as well as two pairs of butt straps, which are bolted in two sections on either side of the bracket clip with the spar of the rudder unit through corresponding bores.

In order for the high strains in the spars to be safely removed into the airplane fuselage, the spars are provided in the joining area with frequently very large oversizes in order to reduce the strains on the bore face resulting from the forces transmitted from the bolts to the bore walls. As the forces are then removed from the butt straps into the bracket clip, the bracket clip also has to have a correspondingly large thickness so that the strains on the bore face occurring in the bores can be kept as low as possible.

This solution proves to be a problem in that for transmission into the airplane fuselage, the loads equally distributed over the spars are first locally concentrated on the connecting bolt and generate very high strains on the bore face in the bores in the bracket clip as well as in the spars themselves. However, the dimensions required due to this load concentration in the joining area of the spars cause considerable extra weight, which is of course undesirable in the field of aerospace technology.

SUMMARY OF THE INVENTION

Consequently, amongst other things, there may be a need to propose a component joint for transmitting lateral forces, wherein additional oversizes in the joining area are not required so that additional and unnecessary weight can be saved.

According to a first aspect of this invention, the above need may be solved by a lateral force joint for connecting two plates. If plates are mentioned here, this does not necessarily mean that they have to be of metallic material; rather a plate as understood by this invention can also be comprised of plastic material or fiber material, such as carbon fiber.

The two plates are a first plate and a second plate, a through bore with a first diameter being provided in the first plate. At a first surface of the second plate a cylinder is formed, the diameter of which is adapted to the first diameter of the through bore in the first plate. It may be ensured thereby that the cylinder of the second plate positively fits together with the through bore in the first plate, so as to be able to transmit forces directed perpendicularly to the center line of the cylinder from the first to the second plate and vice versa. If it is mentioned here that the diameter of the cylinder is adapted to the first diameter of the through bore in the first plate, this means that the diameter of the cylinder is slightly smaller than the diameter of the through bore, so that it can be fitted therein with a small clearance.

In order to reduce undesirably high strains on the bore face, the lateral force joint according to an embodiment of the invention thus may make use of a different solution than the previously described known configuration of a splice joint. If in the latter case the strain on the bore face may be reduced via the component thickness of the spar by using an additional oversize, then according to an embodiment of the invention, the strains on the bore face may be reduced by choosing the diameter of the through bore and the cylinder as large as possible, resulting in an increase of the effective bearing area and consequently a reduction of the strains on the bore face.

In order to allow for adjustment of the cylinder of the second plate with respect to the through bore in the first plate, both the cylinder and the through bore may be arranged eccentrically on or in a separate component of the first or second plate, which may be fitted rotatably in the plane of the first or second plate. Thus, the first plate may comprises a first bearing bush, which may be inserted into the first plate so as to be rotatable around its center line in the plane of the first plate. Herein, the through bore of the first plate may be configured eccentrically in the first bearing bush so that a rotation of the bearing bush may modify the position of the through bore in order to align the latter with respect to the location of the cylinder of the second plate.

The bearing bush may be a cylindrical hollow body, which may be provided at one end with an annular flange to come in abutment with a first surface of the first plate. This annular flange may thus be used to ensure positional security for the bearing bush with respect to the first plate.

To allow for the first plate to be connected at the second surface thereof opposite the first surface level with the second plate, the first bearing bush, at the end thereof opposite the annular flange, may be substantially flush with the second surface of the first plate.

As is evident for those skilled in the art from the foregoing explanations, when using the first bearing bush with its through bore arranged eccentrically, only a positional adjustment on a circular path may be possible. However, in order to be able to precisely adjust the lateral force joint for any point, the second plate further may comprise a circular disc, at which the cylinder of the second plate is formed eccentrically. In order to allow for positional adjustment of the cylinder, the circular disc may be arranged in the plane of the second plate to be rotatable around its center line, so that in combination with the rotatability of the bearing bush in the first plate, positional adjustment with respect to almost any point may be possible.

According to a particular embodiment, the circular disc of the second plate may also be configured as a bearing bush. This means that the circular disc in the shape of a bearing bush also has a through opening for weight saving, through which, for positional security of the first and second plates with respect to each other, e.g. a safety bolt can be inserted. In case the circular disc of the second plate is a bearing bush, the cylinder of the second plate is consequently configured as a hollow cylinder with a through opening. In this case, the circular disc is a circular perforated disc with a hole, the through opening of the hollow cylinder being aligned with the hole of the circular perforated disc.

In order to ensure positional security for the bearing bush of the second plate so that it cannot drop from the second plate, the bearing bush may be provided with an annular flange, which may be configured to be in abutment with a second surface opposite the first surface of the second plate.

In order to allow for the first and second plate to be connected together at the same level, the bearing bush of the second plate may be flush with the first surface of the second plate, which surface contacts the first plate when both plates are connected.

According to another aspect of the present invention, a spar for a rudder unit is proposed, which may be configured at least in a joining area to be mounted on an airplane fuselage as a first plate as understood in the foregoing description. Due to this configuration of the spar, it may be possible to fasten the latter to a fastening strap mounted on an airplane fuselage, in as far as the strap is configured as a second plate as understood in the foregoing description.

SHORT DESCRIPTION OF THE DRAWING

Hereafter, the invention will be explained in further detail with reference to the appended illustrative drawings. In the drawings.

Throughout all figures, the same or similar items are identified with the same or corresponding reference numerals. The figures are not to scale, but represent qualitative proportions.

DETAILED DESCRIPTION OF AN EXEMPLARY EMBODIMENT

Figure 1:
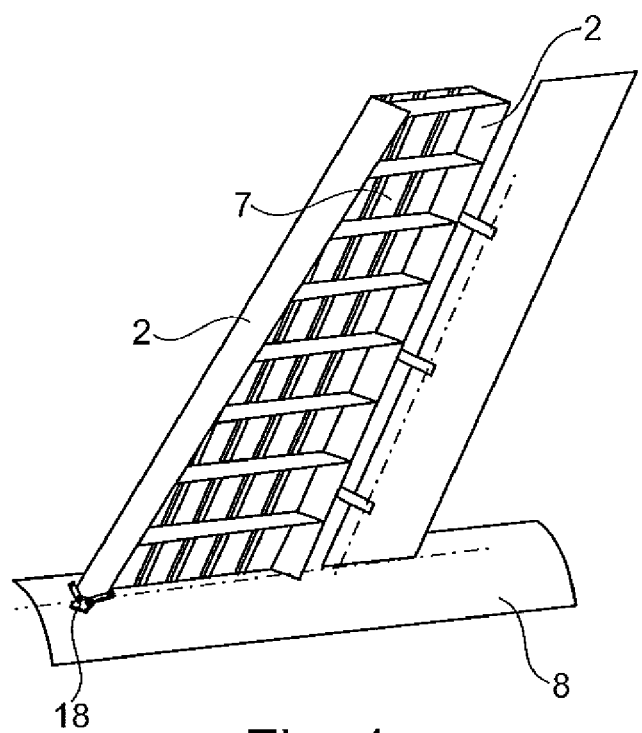
FIG. 1 shows a known type of mounting a rudder unit to an airplane fuselage.
Figure 2:
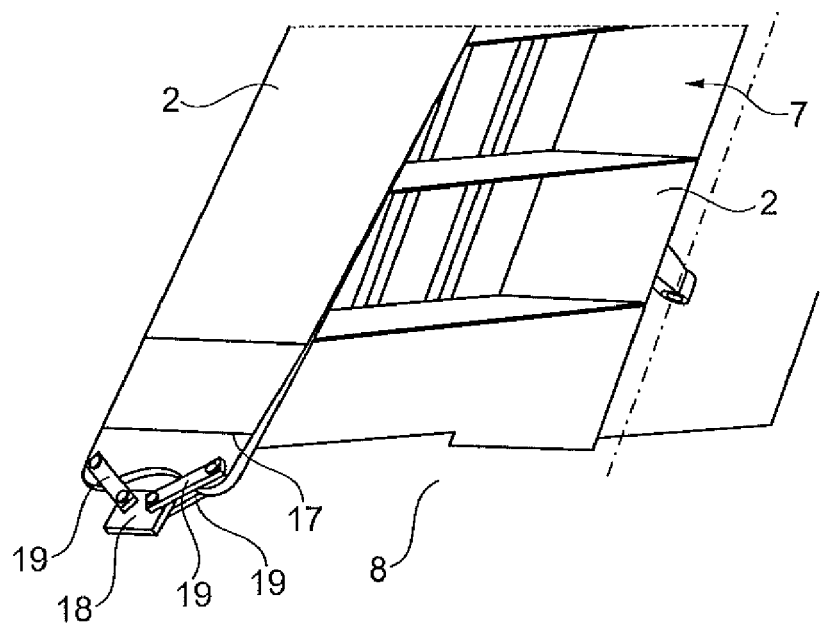
FIG. 2 shows a detailed view of FIG. 1 at the joining area of the rudder unit on the airplane fuselage.

With reference to FIGS. 1 and 2, first a known joint of a center box 7 of a rudder unit at an airplane fuselage 8 is described. The center box 7 is formed laterally substantially by two side faces reinforced crosswise and sideways by webs and stringers, which side faces are fastened front and aft at the spars 2 of the rudder unit. The spars 2 in turn are fastened to the airplane fuselage 8 by using a known joint, which is to be discussed in further detail. As in flight, high air loads affect the large side faces of the rudder unit, it must be able to remove them safely via the spars 2 in the airplane fuselage 8. As in flight the whole rudder unit is loaded with lateral wind forces, and these forces can exclusively be removed into the airplane fuselage 8, these forces cumulate throughout the rudder unit, and are removed punctually into the airplane fuselage 8 via the known joint, to be described hereafter in further detail.

As shown in FIG. 2, the spar 2 has in the joining area thereof with the airplane fuselage 8 an oversize 17, wherein two bores are provided. On the other had, at the airplane fuselage 8, a bracket clip 18 is mounted, which is also provided with two bores. The strap 18 then has the same thickness ratios as the oversize 17 of the spar 2 at the joining area. The spar 2, at the oversize 17 thereof, is connected with strap 18 via a double shear paired splice joint in the shape of two butt straps 19 arranged in pairs, which are bolted to the oversize 17 or the strap 18 through the corresponding bores.

The oversize 17 of the spar 2 has to be provided, as the lateral forces to be transmitted are very high, and otherwise inadmissibly high strains on the bore face would occur in the bores through which the butt straps 19 are bolted. As such joining of the spar 2 is very complicated due to the oversize 17 and the strap 18 configured with corresponding thickness, as well as the additional butt straps 19, and implies additional weight, the present invention chooses a different way for joining the rudder unit to the airplane fuselage, which will be explained hereafter more in detail by means of FIGS. 3 to 6.

Figure 3:
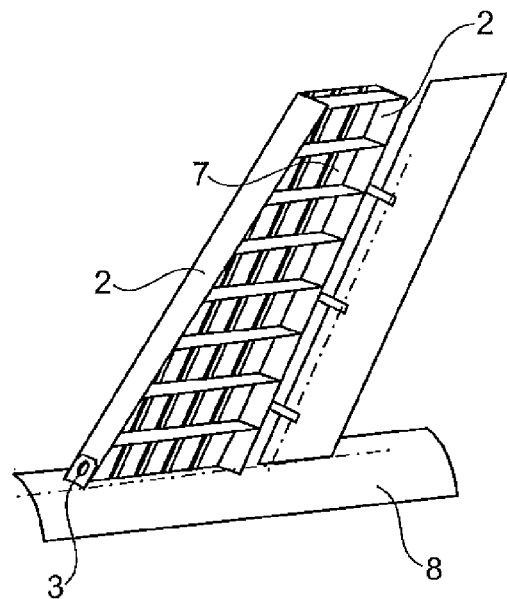
FIG. 3 shows a rudder unit with the lateral force joint according to the invention on an airplane fuselage.
Figure 4:
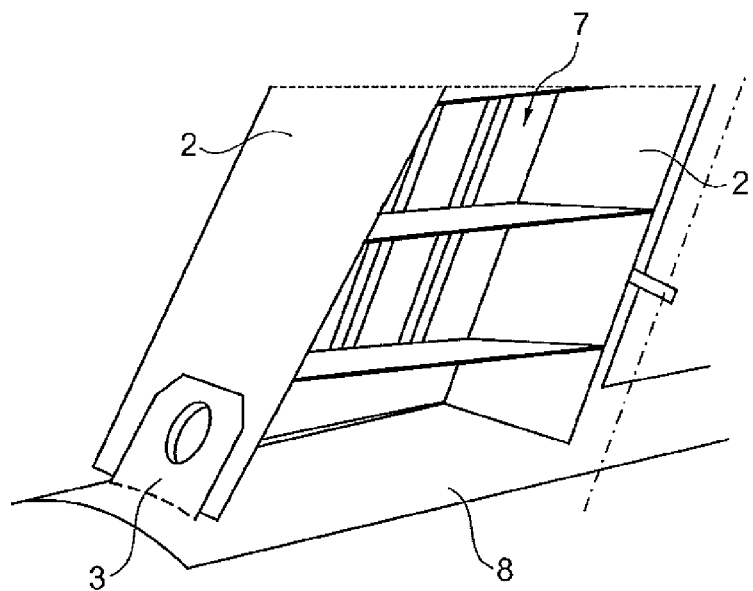
FIG. 4 shows a detailed view of FIG. 3 at the joining area on the airplane fuselage.

First of all, FIGS. 3 and 4 show overviews of the lateral force joint according to the invention of a rudder unit 7 on an airplane fuselage 8. Although the general structure of the rudder unit 7 corresponds to that of the rudder unit previously described with reference to FIGS. 1 and 2, the joining area of the spars 2 at the airplane fuselage 8 differs from the previously described joint. As can be seen from FIG. 4, the plate-like spar 2 maintains its thickness throughout its whole length, and in particular at the base area thereof has no or only little oversize so that weight saving can be achieved in contrast with the configuration previously described with reference to FIGS. 1 and 2. As can best be seen from FIG. 4, at the airplane fuselage 8, a second plate or a fuselage strap 3 is mounted, at which the spar 2 abuts level to be fastened by use of the lateral force joint to be described hereafter in further detail.

Figure 5:
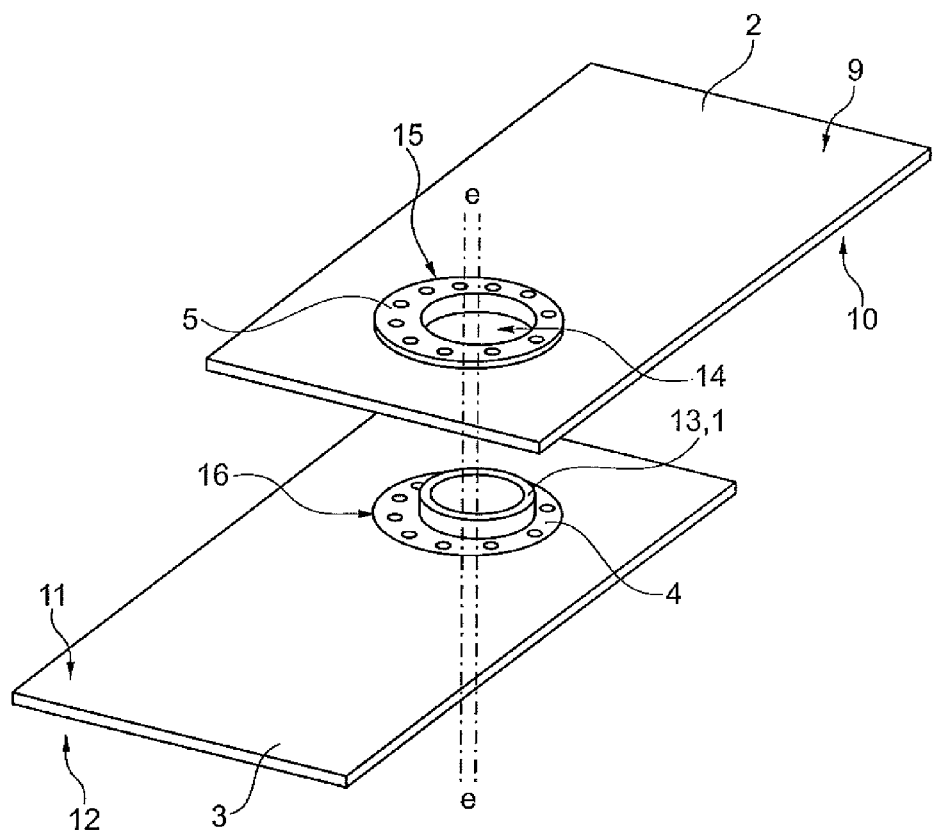
FIG. 5 shows a perspective illustration of a disassembled lateral force joint according to the invention.

FIG. 5 shows the lateral force joint according to the invention of two plates 2, 3 in the shape of spar 2 or fuselage strap 3 in a disassembled state, wherein plate 2 is opposite plate 3 at a distance. As can be seen, the first plate 2 comprises a through bore 14 and the second plate 3 comprises a cylinder 13 (here a hollow cylinder). The through bore 14 and the cylinder 13 have inner and outer diameters adapted to each other so that the hollow cylinder 13 can be introduced into the through bore 14 so that the plates 2, 3 are positively connected together in a transverse direction to the center line of the cylinder 3, whereby it is possible that forces acting transversely on a plate 2, 3 can be transmitted to the respectively other plate 3, 2. By choosing the diameter of the through bore 14 and the cylinder 13 as large as possible, the strains on the bore face occurring during force transmission from one plate 2 to the other plate 3 are minimized so that no inadmissibly high material strains occur.

As can further be seen from FIG. 5, a bearing bush 5 is fitted into the first plate 2 as a component thereof, the bush being rotatable in the plane of the first plate around its center line. In the bearing bush 15, the through bore 14 of plate 2 with an eccentricity e is arranged so that the center of gravity of the through bore 14 describes a circle when the bearing bush 15 is rotated.

At the upper end, the bearing bush 5 is provided with an annular flange 15, which is located in the illustration of FIG. 5 in abutment with the top side 9 of plate 2, whereby the position of the bearing bush 5 with respect to the plate 2 is secured. On the bottom side 10 thereof, the plate 2 is flush with the lower end of the bearing bush 15 so that no projections result for the plate 2 to be adjacent to plate 3 at the same level.

In plate 3, as a component thereof, a circular disc 4 is fitted so that it can be rotated in the plane of the second plate 3 around its center line. At the circular disc 4, the cylinder 13 of the second plate 3 is arranged eccentrically (eccentricity e) so that when the circular disc 4 is rotated around the center line thereof the cylinder describes a circular motion.

Due to the rotatability of the circular disc 4 the location of the cylinder 13 can be adapted to the respective position of the through bore 14 of the bearing bush 5. Conversely, the rotatability of the bearing bush 5 allows for the location of the through bore 14 to be adapted to the respective position of the cylinder 13 of the circular disc 14.

In the embodiment represented in FIG. 5 of the lateral force joint according to the invention, the circular disc 4 is also configured as a bearing bush, which means that a through opening extends throughout the circular disc 4 including the cylinder 13. This through opening can be used in the assembled state represented in FIG. 6 of the lateral force joint according to the invention in as far as it is possible to insert through this through opening e.g. a safety bolt in order to avoid unintentional loosening of the lateral force joint.

At the lower end represented in FIG. 5, the annular disc 4 has an annular flange in the shape of a bearing bush in abutment with the bottom side 12 of the second plate 3, which is however not visible due to the perspective representation of FIG. 5. At the top side 11, the annular disc 4 is flush with the top side 11 of the second plate 3 so that only the cylinder 13 protrudes upwards.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

Figure 6:
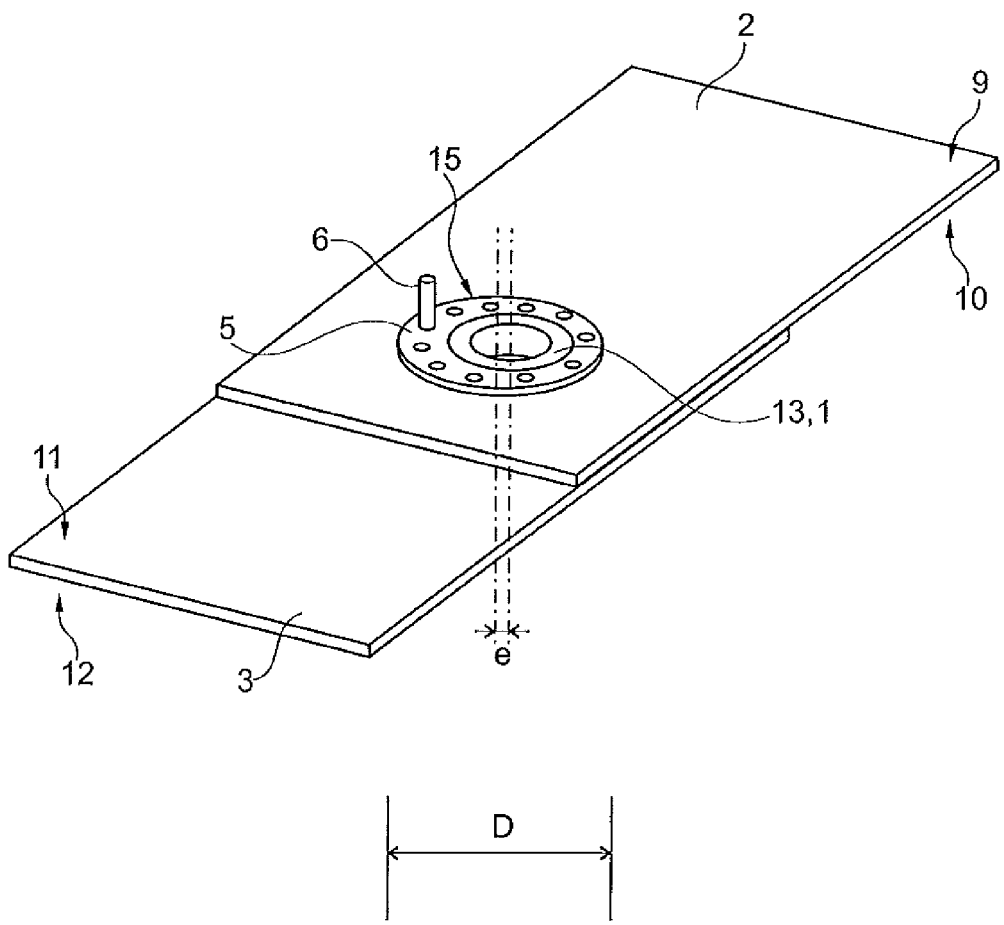
FIG. 6 shows a perspective illustration of the lateral force joint according to the invention of FIG. 5 in an assembled state.

In order to avoid that in the assembled state of the lateral force joint of the invention, shown in FIG. 6, the bearing bush 5 of the first plate can be rotated with respect to the bearing bush 4 of the second plate 3, both bushes have appropriate locking mechanisms to locate their respective location. E.g., both bearing bushes 4, 5 can have a plurality of holes in their annular flanges, through which a locking pin 6 can be inserted to secure both bearing bushes 4, 5 with respect to each other.

REFERENCE LIST 1 hollow cylinder
2 first plate or spar
3 second plate or fuselage strap
4 annular perforated disc (second bearing bush)
5 first bearing bush
6 locking device
7 center box (rudder unit)
8 airplane fuselage
9 first surface of first plate
10 second surface of first plate
11 first surface of second plate
12 first surface of first plate
13 cylinder
14 through bore
15 annular flange of first bearing bush
16 annular flange of second bearing bush
17 oversize
18 bracket clip
19 butt strap

What is claimed is:

1. A lateral force joint, comprising:
a first plate, in which a through bore with a first diameter is provided, and
a second plate with a first surface, at which a cylinder is formed having a diameter which is adapted to the first diameter so that the cylinder of the second plate positively fits together with the through bore in the first plate for transmitting forces directed perpendicularly to the center line of the cylinder from the first plate to the second plate and vice versa.

2. The lateral force joint according to claim 1,
wherein the first plate further comprises a first bearing bush, which is inserted into the first plate so that the first bearing bush is rotatable around its center line in the plane of the first plate, and
wherein the through bore of the first plate is configured eccentrically in the first bearing bush.

3. The lateral force joint according to claim 2,
wherein the first plate has a first surface, and wherein the first bearing bush has an annular flange, which is configured for abutment with the first surface.

4. The lateral force joint according to claim 3,
wherein the first plate has opposite the first surface a second surface, with which the first bearing bush is substantially flush.

5. The lateral force joint according to claim 1,
wherein the second plate further comprises a circular disc, which is inserted into the second plate so that the circular disc is rotatable around its center line in the plane of the second plate, and
wherein the cylinder of the second plate is formed eccentrically at the circular disc.

6. The lateral force joint according to claim 5,
wherein the circular disc is configured as a second bearing bush.

7. The lateral force joint according to claim 5,
wherein the cylinder is a hollow cylinder with a through opening.

8. The lateral force joint according to claim 7,
wherein the circular disc is an annular perforated disc with a hole, wherein the through opening of the hollow cylinder is aligned with the hole of the annular perforated disc.

9. The lateral force joint according to claim 5,
wherein the second plate has a second surface opposite the first surface, and wherein the second bearing bush has an annular flange, which is configured for abutment with the second surface of the second plate.

10. The lateral force joint according to claim 5,
wherein the second bearing bush is substantially flush with the first surface of the second plate.

11. A spar for a rudder unit, which is configured at least in a joining area to be mounted on an airplane fuselage as a first plate in which a through bore with a first diameter is provided, in order to be connected with a fastening strap mounted on the airplane fuselage and configured as a second plate with a first surface, at which a cylinder is formed having a diameter which is adapted to the first diameter so that the cylinder of the second plate positively fits together with the through bore in the first plate for transmitting forces directed perpendicularly to the center line of the cylinder from the first plate to the second plate and vice versa;

wherein the second plate further comprises a circular disc, which is inserted into the second plate so that the circular disc is rotatable around its center line in the plane of the second plate, and wherein the cylinder of the second plate is formed eccentrically at the circular disc.

12. A lateral force joint, comprising:

a first plate, in which a through bore with a first diameter is provided, and a second plate with a first surface, at which a cylinder is formed having a diameter which is adapted to the first diameter so that the cylinder of the second plate positively fits together with the through bore in the first plate for transmitting forces directed perpendicularly to the center line of the cylinder from the first plate to the second plate and vice versa, wherein the first plate further comprises a first bearing bush, which is inserted into the first plate so that the first bearing bush is rotatable around its center line in the plane of the first plate, and wherein the through bore of the first plate is configured eccentrically in the first bearing bush, wherein the second plate further comprises a circular disc, which is inserted into the second plate so that the circular disc is rotatable around its center line in the plane of the second plate, and wherein the cylinder of the second plate is formed eccentrically at the circular disc.

\* \* \* \* \*